United States Patent [19]
Pfaltzgraff

[11] Patent Number: 4,819,515
[45] Date of Patent: Apr. 11, 1989

[54] METHOD AND APPARATUS FOR GRINDING SAW TEETH

[75] Inventor: James R. Pfaltzgraff, Beaverton, Oreg.

[73] Assignee: Armstrong Manufacturing Company, Portland, Oreg.

[21] Appl. No.: 67,523

[22] Filed: Jun. 26, 1987

[51] Int. Cl.⁴ .................... B24B 49/04; B23D 63/14
[52] U.S. Cl. .................... 76/41; 51/165.71; 51/165.83
[58] Field of Search ............ 76/37, 41, 112; 51/165.71, 165.83, 165.85, 165.9, 165.91, 165 R, 281 R

[56] References Cited

U.S. PATENT DOCUMENTS

| | | |
|---|---|---|
| 3,611,839 | 10/1970 | Idel et al. |
| 3,842,545 | 10/1974 | Possati |
| 4,366,728 | 1/1983 | Beck et al. |
| 4,418,589 | 12/1983 | Gowart, Sr. |
| 4,483,217 | 11/1984 | Beck et al. |
| 4,488,458 | 12/1984 | Beck et al. |
| 4,539,777 | 9/1985 | Brown et al. ............ 51/165.91 |
| 4,587,867 | 5/1986 | Pokorny et al. |

OTHER PUBLICATIONS

Original Vollmer EMS, EMSE, EMSE 80U, "Equalizing Machine for Stellite Tipped and Swaged Band, Gang and Circular Saw".

Primary Examiner—Roscoe V. Parker
Attorney, Agent, or Firm—Klarquist, Sparkman, Campbell, Leigh & Whinston

[57] ABSTRACT

An apparatus for grinding saw teeth of a saw blade measures and grinds the tip of each tooth independently before advancing successively each tooth on the saw blade for grinding. The apparatus includes a pair of grinding wheels movable toward and away from a sawtooth secured in the grinding position. The grinding wheels are under the control of programmable controller which moves the grinding wheels in response to measurements of the side clearances on the tooth made by a tip measurement probe. The method includes measuring the side clearance of a sawtooth in the grinding position with the probe, comparing the measured dimension to a preselected dimension, and moving the grinding wheels to grind the tooth if the measured dimensions exceeds the preselected dimension. Another measurement is taken and the steps are repeated for each tooth until the sawtooth is ground within the preselected dimension. The next tooth is then advanced to the grinding position.

20 Claims, 7 Drawing Sheets

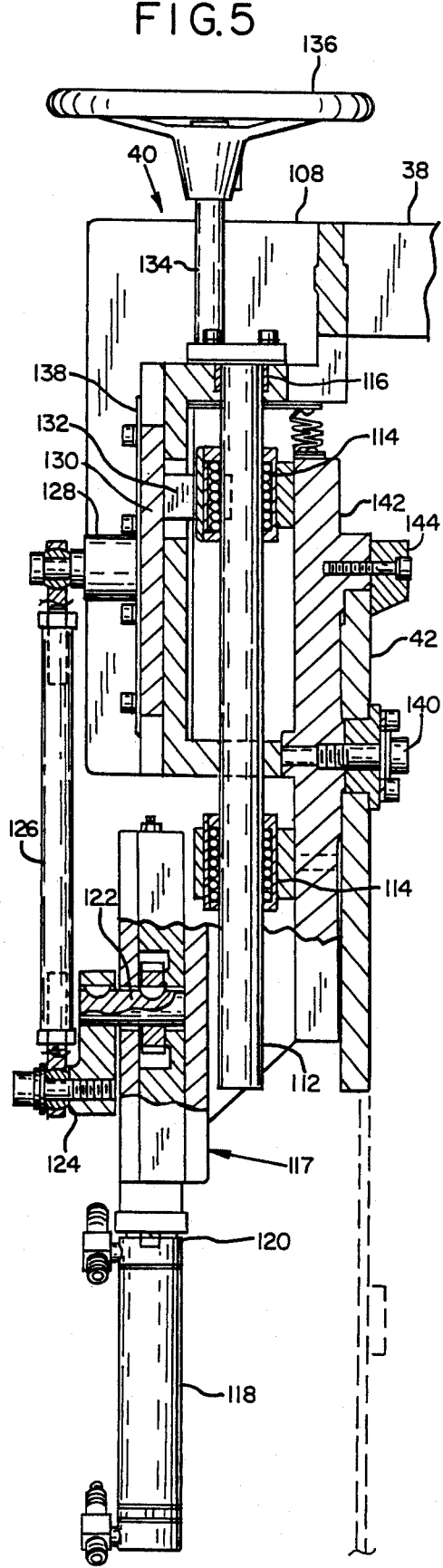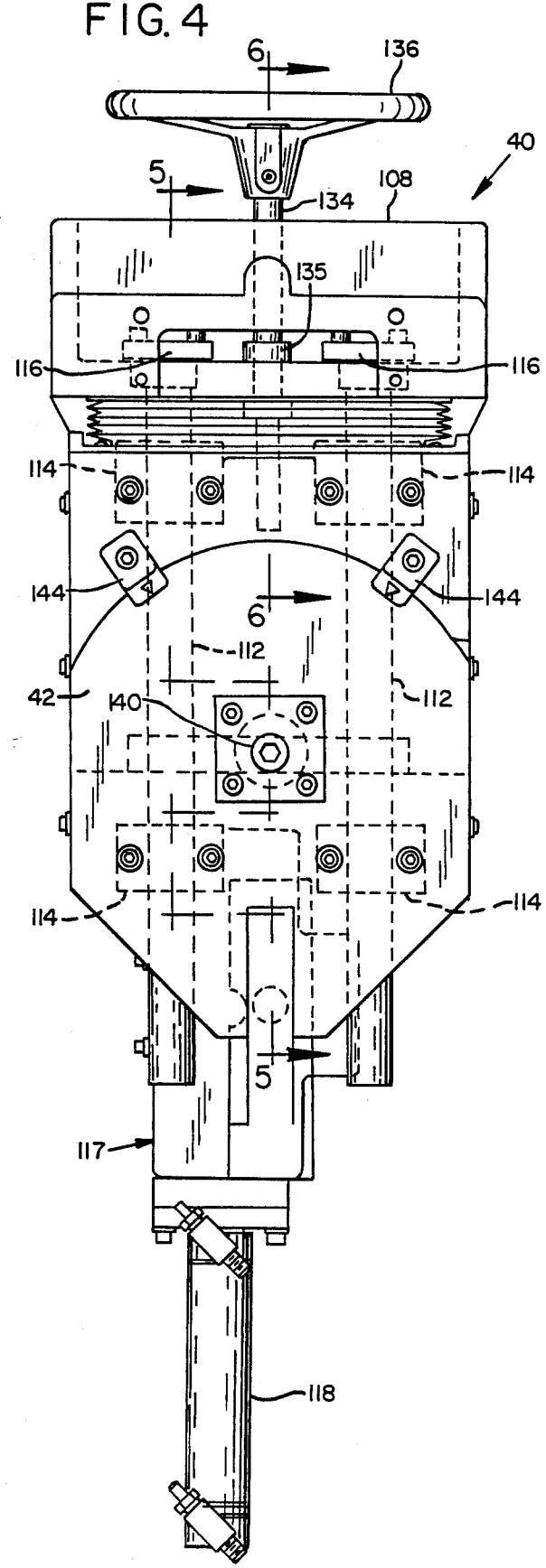

METHOD AND APPARATUS FOR GRINDING SAW TEETH

TECHNICAL FIELD

This invention generally relates to apparatus for sharpening saw blades and more particularly to apparatus for grinding saw teeth to a preselected dimension.

BACKGROUND OF THE INVENTION

Saw blades for cutting wood, metal, and the like often have a plurality of teeth cut into the blade's outer edge. In many cases, the teeth are tipped with a hard material such as carbide or STELLITE, a cobalt alloy, to reduce wear and maintain sharpness. An apparatus for tipping the teeth of a saw blade is disclosed in my copending application, filed concurrently herewith and entitled Method and Apparatus for Tipping Teeth of Saw Blades, Ser. No. 07/067,645, incorporated herein by reference.

When a tooth is tipped, it is oversized and must be ground to desired dimensions and tangential and radial clearance angles for cutting the proper kerf. The tangential clearance angle is viewed from above the tooth and measures the inward taper of the tooth from the tooth face rearward. The radial clearance angle is viewed from the face of the tooth and measures the inward taper from the tooth top toward the blade.

Prior apparatus for grinding tipped saw teeth to proper dimension and clearance angles, such as manufactured by Vollmer Werke Maschinenfabrik GmbH of Germany, include a pair of opposed grinding wheels adjusted to grind teeth to the desired compound taper formed by the tangential and radial clearance angles. The two grinding wheels are set a predetermined distance apart to grind the opposite sides of a tooth secured in a grinding position. The following tooth on the blade is then advanced to the grinding position and the operation repeated. This continues until all teeth of the blade are ground to the preselected dimension. The teeth are then measured manually for the desired dimension; and if additional material must be removed, the grinding wheels are reset and each tooth in succession is again ground.

U.S. Pat. No. 4,418,589 to Cowart, Sr., teaches the use of a programmable controller for supervising the grinding of saw blade teeth. However, Cowart, Sr., does not contemplate automated measurement of the resultant tooth dimensions. Instead, the controller is used to supervise the advancement and retraction of the grinding wheels in response to signals indicating the position of and the pressure on a pawl of an indexing system. The travel of the grinding wheels is controlled by precision limit switches.

In U.S. Pat. No. 3,842,545 to Possati, the dimensions of the article being machined are sensed by an electronic sensor and are fed to an electronic controller. The controller computes from this dimension data the rate at which material is being removed from the article. When the sensors determine that the article has been machined within a preset value of its desired dimension, the measuring sensors are physically withdrawn. The machine tool then continues operation for a length of time sufficient, based on the computer rate at which material is being removed, for the article to be machined to its desired dimension. The withdrawal of the measuring sensors before the machining is complete allows the apparatus to more rapidly disengage the finished article and accept the next article for machining.

Other prior apparatus rely exclusively on mechanical stops to limit the travel of sawtooth grinding wheels. Examples of such systems are U.S. Pat. Nos. 3,611,839 to Idel and 4,366,728 to Beck et al. The Idel patent discloses an apparatus for sharpening and resetting teeth on a band saw. The band is spring biased towards the grinding wheel until a stop member prevents its further travel. The principal feature of the Idel patent is an arrangement that allows the sharpening angles to be reset readily to adapt to saws having differently shaped teeth.

The Beck et al. '728 patent discloses a machine for preparing hard alloy tipped saw blades. A saw blade is clamped into the machine and brazing and grinding tools are sequentially operated to remove a damaged saw tip, recondition the plate seat, braze on a new tip, and grind the new tip to the desired shape. The grinding operation is effected by advancing a pair of grinding wheels towards the blade a predetermined distance and then retracting the wheels. No feedback control is provided.

These and other prior grinding apparatus suffer from a number of drawbacks. For one, the apparatus are labor intensive, requiring manual measurement of the dimensions desired after each grinding. For another, they do not treat each tooth individually. No means for compensating for misaligned teeth or worn grinding mechanisms are provided. A third drawback is the wear on the apparatus. Each tooth must be ground a number of times as the blade is repeatedly passed between the grinding wheels. This repeated grinding causes causes the apparatus to wear out more quickly than if fewer grinds were required.

SUMMARY OF THE INVENTION

An object of the invention, therefore, is to provide a grinding apparatus that automatically measures the working portion of a tool, such as the dimension of a tipped tooth to be ground.

Another object of the invention is to provide a grinding apparatus that automatically grinds a working portion of a tool such as a tooth of a saw blade, to a preselected dimension.

Yet another object of the invention is to provide a grinding apparatus that measures and grinds each tooth of a saw blade to the preselected dimension before advancing to the next tooth on the saw blade.

Still another object of the invention is to provide a grinding apparatus that minimizes the number of times a tooth must be ground and thereby reduces wear on the grinding apparatus and the time required to grind the teeth of a saw blade to preselected dimensions.

In the preferred embodiment, the foregoing objectives are carried out with an apparatus and method that involve measuring a tooth, comparing the measured dimension to a reference dimension, grinding the tooth to remove excess material as determined by the comparison, and then repeating the measuring, comparing, and grinding steps until a tooth is ground to the reference dimensions and before the next tooth in succession is processed. The apparatus includes a programmable controller to control the described functions and their sequencing.

The foregoing and other objects, features, and advantages of the invention will become more apparent from

BRIEF DESCRIPTION OF THE DRAWINGS

FIG. 4 is a front view of a lift assembly within the apparatus.

FIG. 5 is a side view, partly in section, of the lift assembly taken along line 5—5 of FIG. 4.

DETAILED DESCRIPTION OF A PREFERRED EMBODIMENT

Overview

Figure 1:
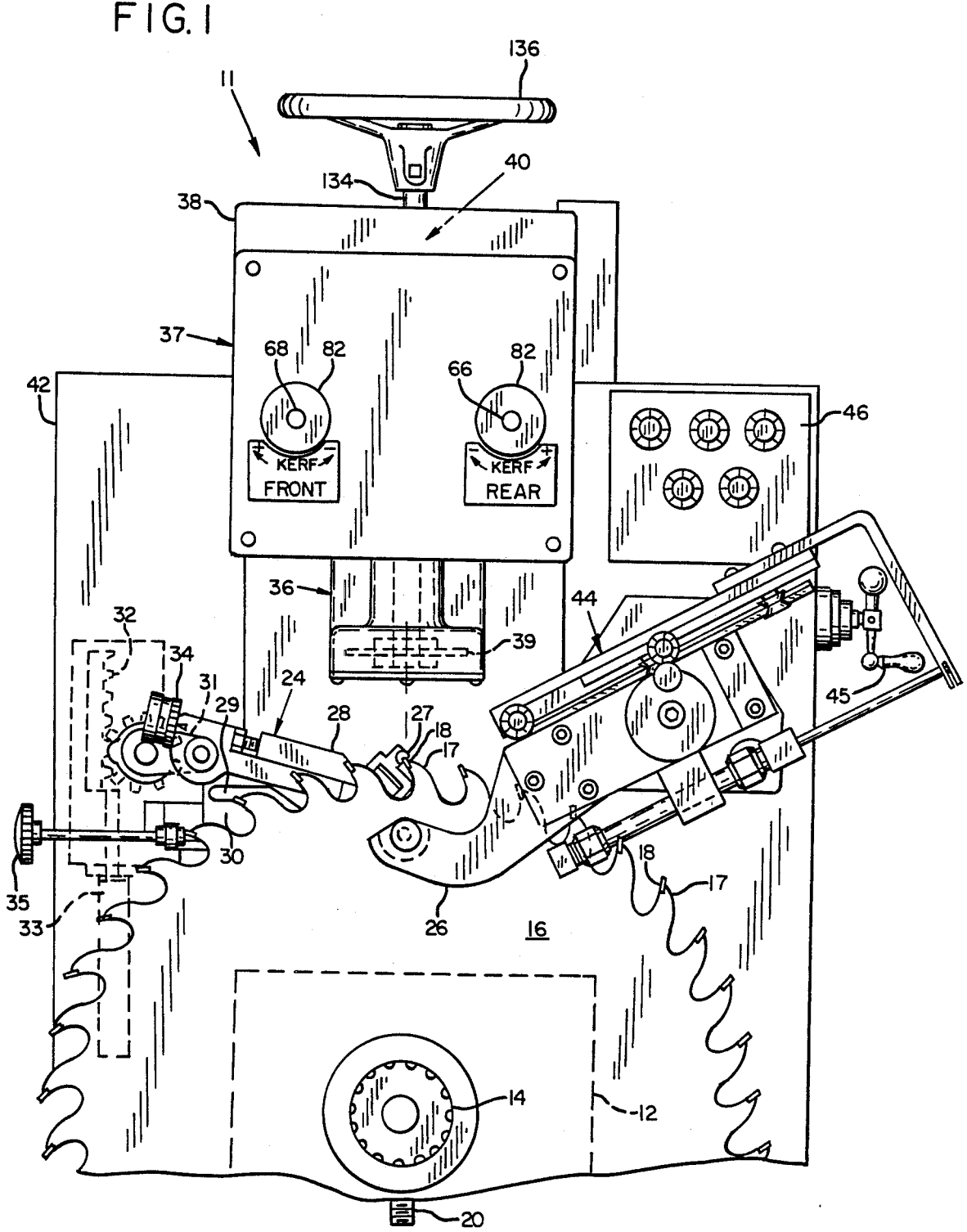
FIG. 1 is a front view of a grinding apparatus according to the invention.

Referring now to FIG. 1 of the drawings, there is shown generally at 11 a grinding apparatus according to the invention. Within the apparatus is a saw blade carriage 12 for mounting saw blades of various types, such as a circular saw blade, band saw blade, etc., for grinding. The carriage 12 is of conventional design and is adapted to accept a chuck 14 from a number of chucks each suited for a particular saw blade to be sharpened. In FIG. 1, for example, the saw blade is a circular saw blade 16 having a plurality of saw teeth 17 that have been tipped with STELLITE cutting tips 18. The carriage 12 can be raised or lowered for appropriate positioning of the saw blade teeth for grinding by means of linkage 20 rotatable by a handle (not shown).

The saw teeth of blade 16 are advanced and secured for grinding by means such as an indexer 24 and hydraulic clamp 26, although it should be understood that any of a number of well-known advancing mechanisms could be used as well. See, for example, the mechanism disclosed in the brochure entitled "Equalizing machine for stellite tipped and swagged band, gang, and circular saws," published by Vollmer Werke of West Germany. In the present embodiment, the indexer 24 includes a feed finger 27 that pushes saw blade 16 by its teeth 17 to position successive teeth in a grinding position at the top dead center of the blade. The finger 27 is spring biased so that it can ride over the back of the adjacent tooth and is driven by a cam follower assembly 28. The assembly 28 rides in a track 29 cut in a base 30 affixed to the frame of apparatus 11. The assembly 28 in turn is moved back and forth along track 29 by a rotary actuator 31 driven by a rack and pinion arrangement 32. The rack and pinion are actuated by a penumatic cylinder 33. Feed finger 27 is notched in its lower right-hand quadrant to engage the tip of the tooth to be advanced to the grinding position. The forward and lateral positions of feed finger 27 are adjustable through adjustment knobs 34 and 35. A tooth advanced to the grinding position is clamped therein by the clamp 26, which is adapted to close and secure the tooth 17 until after the grinding is completed and another tooth is to be advanced. Indexer 24 and clamp 26 are similar in construction to those shown in the aforementioned copending application.

Straddling the plane of the saw blade 16 above the tooth 17 clamped at top dead center is the lower portion of a positioning assembly 36 to which is connected a pickfeed assembly 37. The positioning assembly 36 and pickfeed assembly 37 are mounted to an arm 38 of a lift assembly 40 that is raised and lowered relative to the frame 42 of the apparatus 11. As will be described in greater detail below, the positioning assembly 36 supports a pair of opposed grinding elements such as hydraulically driven grinding wheels 39a, 39b for movement toward and away from the clamped sawtooth 17 to grind the tip 18 of the tooth to preselected clearance angles and forward and rear side dimensions. The lateral movement of the grinding wheels 39 within the positioning assembly 36 is effected by the pickfeed assembly 37. The lift assembly 40 reciprocates the grinding wheels 39 as they grind by repeatedly raising and lowering the arm 38. The lift assembly 40 is further adapted to be pivoted from the vertical position shown through the turning of handle 45 to grind the sawtooth 17 to a desired compound taper.

To the right of the positioning assembly 37 is shown a tip measuring probe 44 for measuring the dimension of interest, defined herein as the forward and rearward side clearances of the tipped sawtooth. The probe 44 is adapted to advance across the clamped sawtooth 17 and measure its side clearances for comparison against a preselected side clearances that are initially set in the probe. The probe 44 transmits the preselected dimensions and the measured dimensions to a programmable controller 46, such as an Allen-Bradley SLC150. The controller responds by actuating the pickfeed assembly 37 and lift assembly 40 to cause the grinding wheels 39 within the positioning assembly 36 to move toward the clamped sawtooth 17 to grind the sides of the tooth. As will be described in the operation of the apparatus 11, the probe 44 repeatedly measures and the grinding wheels 39 repeatedly grind each side of each sawtooth 17 until the measured side clearances are within the preselected dimensions. The controller 46 also controls the indexer 24 and clamp 26 to advance the saw teeth after each tooth 17 has been ground and clamp the next tooth in the grinding position.

Positioning and Pickfeed Assemblies

Figure 2:
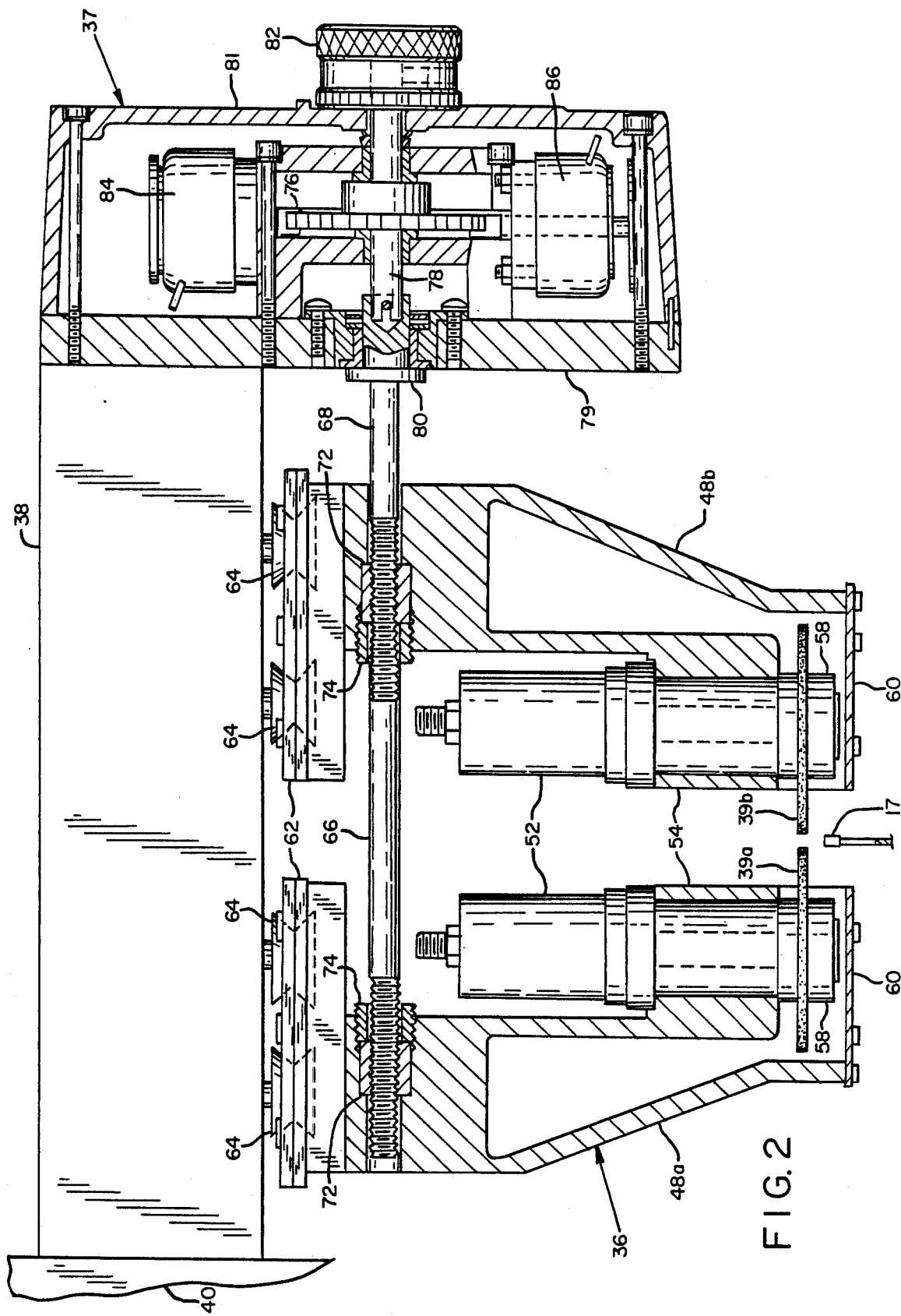
FIG. 2 is a front view, partly in section, of a positioning assembly within the apparatus.

FIG. 2 is a view of the positioning assembly 36 and pickfeed assembly 37, both mounted to the arm 38 of lift assembly 40. The assembly 36 includes a pair of arbor supports 48a, 48b that each support a hydraulic motor 52. Keyed to each motor shaft is an arbor 54 for supporting a grinding wheel 39. Each wheel 39 is secured to its arbor by an arbor nut 58. Below each wheel 39 is a guard 60 mounted to the bottom of the support 48. Mounted to the top of each support 48a, 48b is a track 62 for engaging parallel rows of grooved rollers 64 that extend downward from the bottom of the arm 38. The tracks 62 and rollers 64 enable the supports 48a, 48b and thereby the grinding wheels 39a, 39b to move toward the clamped sawtooth 17 to grind it and away from the tooth before advancement of the next tooth. Grinding wheel 39a grinds the rear side of the tooth, defined as the side closest to the apparatus body, and grinding wheel 39b defines the front side of the tooth.

The feeding of the supports 48a, 48b toward and away from the sawtooth 17 is effected by the pickfeed assembly 37 through a pair of parallel adjustment rods 66 and 68 connecting it to the supports 48a, 48b. The adjustment rod 66 extends from the assembly 37 through an aperture in the support 48b to an aperture in the support 48a, where threads on the rod engage a bushing 72 held within the aperture by a screw 74. Similarly, the adjustment rod 68 extends from the assembly 37 to a second aperture in the support 48b, where threads on the rod engage another bushing 72. Each rod is rotated independently by elements within the pickfeed assembly 37, so that the two supports 48a, 48b can be moved independently of one another toward and away from the clamped tooth 17. Clockwise rotation of the rods 66 and 68 causes the supports 48a, 48b to move to the right in FIG. 2, and counterclockwise rotation causes the arbor supports to move to the left. Thus, the two grinding wheels 39a, 39b can be fed toward the tooth 17 clamped at the grinding position by clockwise rotation of rod 66 and counterclockwise rotation of rod 68 and fed away from the clamped tooth by opposite rotations.

The means within the pickfeed assembly 37 for rotating an adjustment rod is shown in FIG. 2. Each rod is rotated by separate means as shown in FIG. 1. With reference to rod 68 the means shown for rotating, the adjustment rod is rotated by a gear 76 through which a keyed mounting shaft 78 extends. The male end of the shaft 78 engages the female end of rod 68, which rod extends from the support 48b through a lip 79 of arm 38 and a bushing 80 into the assembly 37. The opposite end of the shaft 78 extends through the assembly cover 81 and engages a hand wheel 82 for manual rotation of the adjustment rod 68. The hand wheel is used for roughly positioning the grinding wheels 39a, 39b after the blade is mounted but before the teeth of a saw blade are ground. Once the apparatus 11 is operating, however, the controller 46 rotates the rod 68 via gear 76 and a pair of solenoids 84 and 86.

Figure 3:
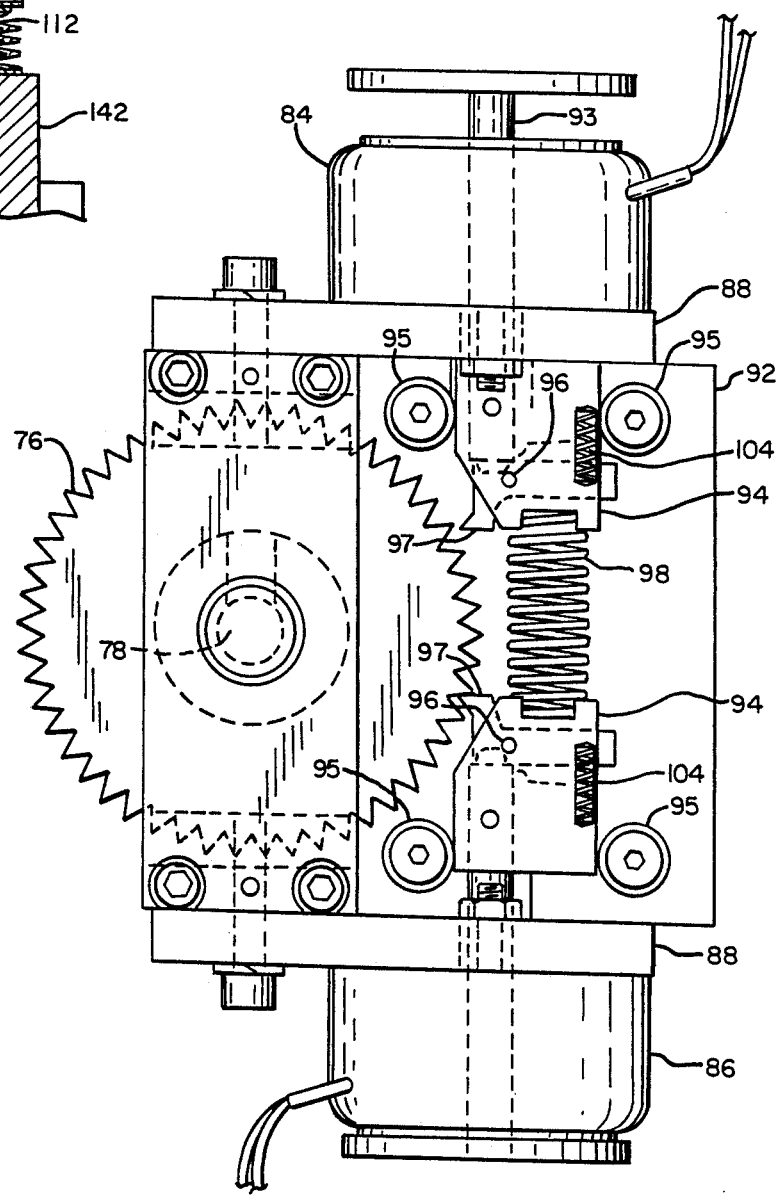
FIG. 3 is a front view of a pickfeed assembly within the apparatus.

Referring now to FIG. 3, the solenoids 84 and 86 are mounted via brackets 88 to the base 92 of the pickfeed assembly 37. The core 93 of each solenoid, when drawn by the magnetic field of the coil, urges a pawl guide 94 forward between cam followers 95 toward the teeth of the gear 76. Pivotally mounted to the guide 94 at a pivot pin 96 is a pawl 97 whose foot engages a tooth of the gear 76 to advance it when the associated solenoid is energized. Each advancement rotates the rod 68 an amount to cause the grinding wheel 39b to move 0.001 of an inch. A compression spring 98 is mounted between opposing pawl guides 94 to urge the guide that is urged forward back to its initial position when its associated solenoid is no longer energized. This retreat of the guide 94 causes the associated pawl 97 to pivot and slide over the following tooth allowing the pawl to retract. Once retracted, a compression spring 104 urges the pawl 97 back into position for engaging another tooth. Repeated actuation of solenoid 84, therefore, rotates adjustment rod 68 clockwise and moves the support 48b away from the front side of tooth 17 in thousandth of an inch increments. Similarly, repeated actuation of solenoid 86 causes adjustment rod 68 to rotate counterclockwise and moves the support 48b toward the front side of tooth 17.

Lift Assembly

The lift assembly 40 that includes arm 38 is best seen in FIGS. 3 through 6. Referring first to FIGS. 4 and 5, the assembly 40 includes a lift carriage 108 that is raised and lowered relative to the fixed frame 42 of the apparatus 11. The carriage slides along a pair of support shafts 112 via upper and lower bearings 114. Each shaft 112 is fixed at its upper ends to the carriage 108 by a locking collar 116. Movement of the carriage 108 is effected by a rack and pinion arrangement 117 driven by a hydraulic cylinder 118. The rack (not shown) of the arrangement 117 engages the teeth of a pinion 122 which engages a rotary actuator 124. Pivotally connected to the opposite end of the actuator 124 is the lower end of a rod 126. Rod 126 in turn is pivotally connected at its upper end to a boss 128 protruding from the outer side of a sliding plate 130 positioned between shafts 112.

Figure 6:
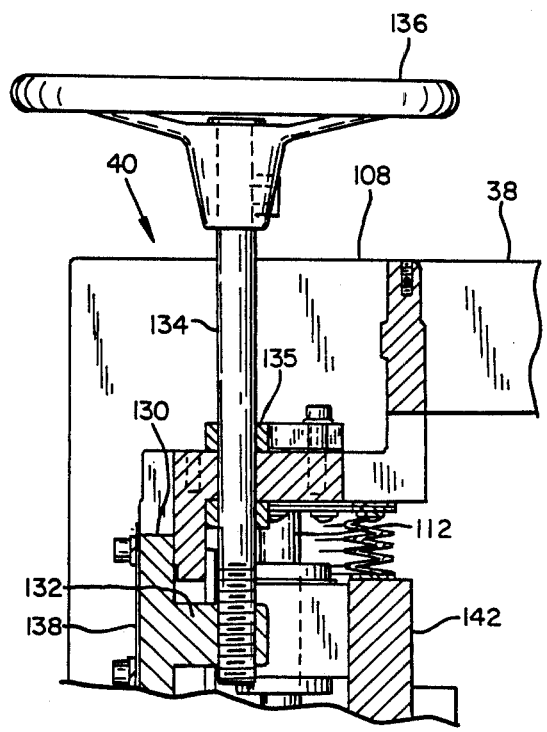
FIG. 6 is a magnified view of a portion of a lift assembly taken along 6—6 of FIG. 4.

Referring now to the magnified view of FIG. 6, a nut 132 protrudes from the inner side of the plate 130. Threaded into the nut is an elongated adjustment screw 134 that extends through the carriage 108 and out its upper surface. On the midportion of the screw is affixed a locking collar 135 for locking the screw to the carriage 108 so that raising and lowering of the screw raises and lowers the carriage relative to the plate 130. On the upper end of the screw 134 is affixed an adjustment wheel 136. The adjustment wheel is rotated for microadjustments of carriage 108 relative to plate 130, which slides within a pair of gibs 138 bolted to the carriage. The wheel 136 thus is turned for positioning assembly 40 at an appropriate height relative to the teeth of saw blade 16. This adjustment is typically done before the initial grinding begins on the saw teeth. During grinding operations of the apparatus 11, cylinder 118 causes the carriage 108 to reciprocate via movement of actuator 124 and rod 126 to raise and lower the grinding wheels 39a, 39b along their rotational axes as they grind the sides of a clamped tooth 17. The cylinder 118 in turn is controlled by the programmable controller 46.

To grind the sawtooth 17 to the desired compound taper, lift assembly 40 is pivotable about a pivot connection 140, shown in FIG. 5, by appropriate rotation of handle 45. A pivot plate 142 affixed to the assembly 40 slides along the arcuate edge of a section of apparatus frame 42. This pivoting changes the angle of arm 38 relative to the vertical and therefore the orientation of the positioning assembly 36. Consequently, the plane of the grinding wheels 39a, 39b within the positioning assembly 34 changes and the wheels will grind teeth 17 in a different plane. The pivoting is controlled by a pair of pivot clamps 144, whose grip may be adjusted to enable the assembly 40 to be pivoted to the desired angle and then remain at that angle without further effort.

Tip Measuring Probe

Figure 7:
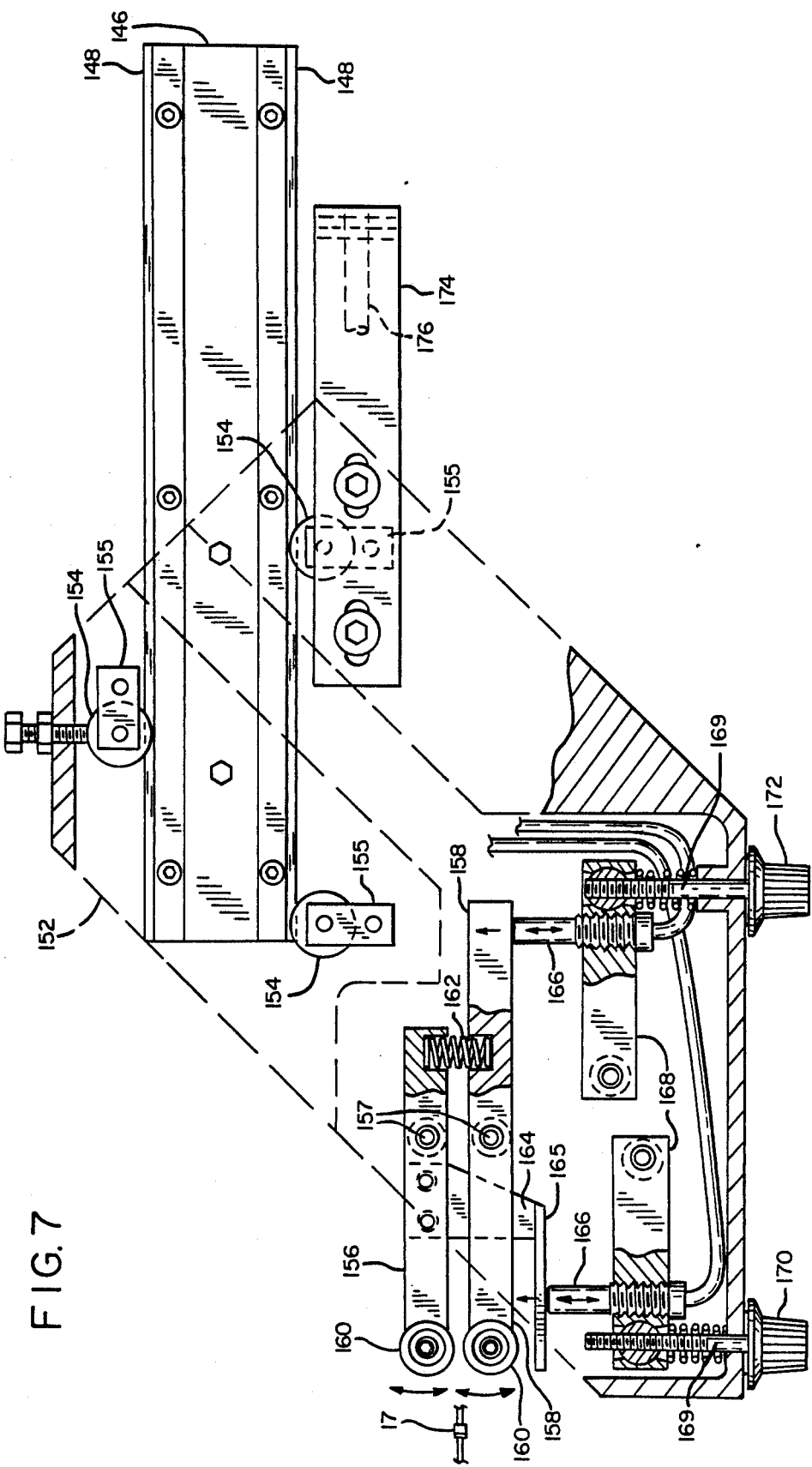
FIG. 7 is a top view of a tip measuring probe within the apparatus.
Figure 8:
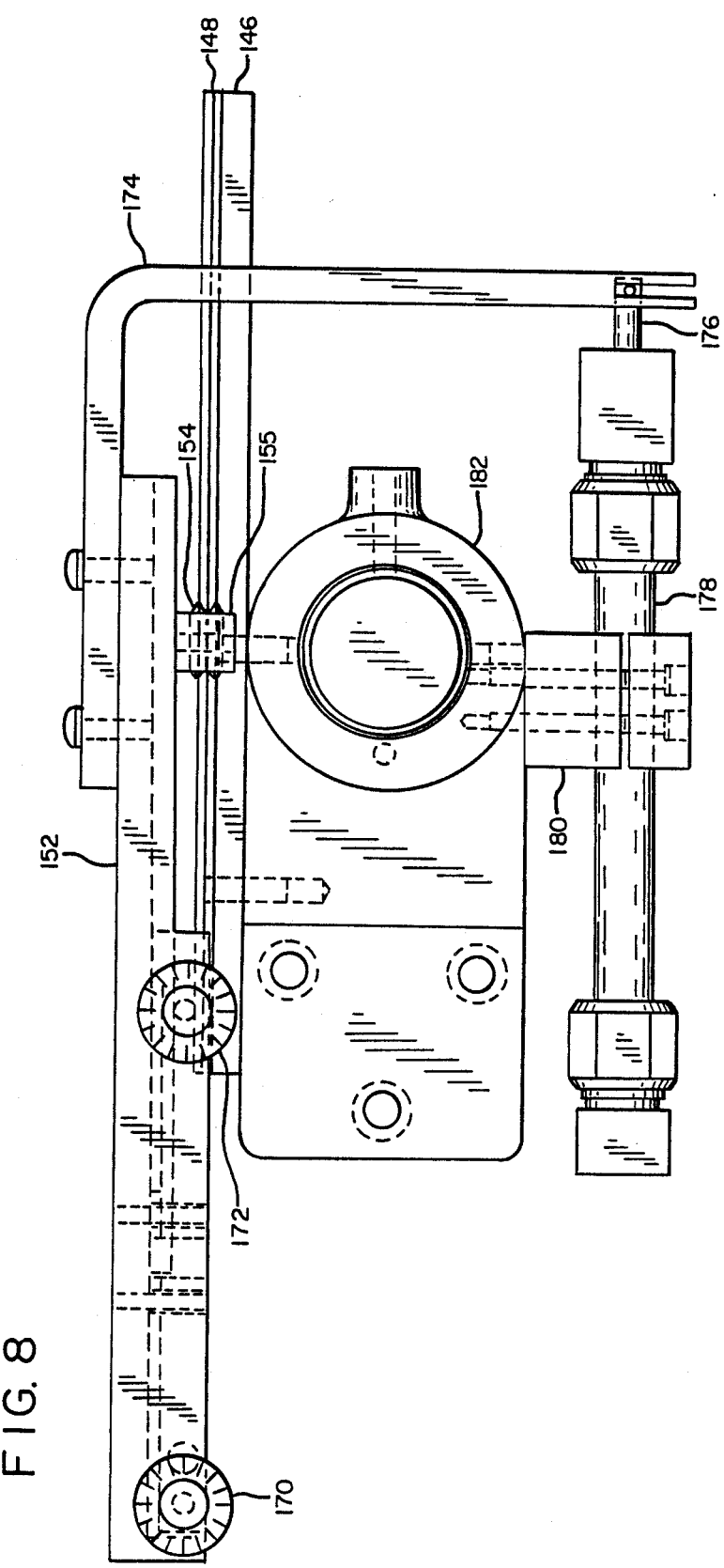
FIG. 8 is a side view of the tip measuring probe taken along line 8—8 of FIG. 7.

A top view of the tip measuring probe 44 illustrated in FIG. 1 is shown in FIG. 7, with a side view thereof shown in FIG. 8. The probe 44 includes an elongated base 146 to which tracks 148 are mounted. Movable along and above the tracks 148 is a plate 152 held thereon by grooved rollers 154 which are secured to the bottom of the plate by clevises 155. Underneath the forward portion of the plate 152 is pivotally mounted at points 157 a pair of opposed sensing arms 156 and 158 that extend beyond the edge of plate 152 and are positioned to straddle the plane of the saw blade 16. On the forward end of each sensing arm 156 and 158 is rotatably mounted a cam follower 160. Mounted between the rear of sensing arm 156 and the rear portion of sensing arm 158 is a compression spring 162 that urges the forward ends of the two arms together. Attached to the arm 156 is a contact plate 164 that extends under arm 158 and bends upward to form a target 165.

Adapted to press against the target 165 and the rear of arm 158 are electrical sensors 166 which electrically sense the proximity of the target 165 and rear of arm 158. The sensors 166 are threaded within free ends of separate adjustment arms 168 that are pivotally connected to the plate 152. These arms 168 are pivotable to urge the sensors 166 toward or away from the sensing arms 156 and 158 by rotation of shafts 169 threaded into nuts mounted in the free end of each arm 168 and rotated by scaled adjustment knobs 170 and 172, respectively. For selecting the desired reference tooth dimensions, the spacings of cam rollers 160 on arms 156 and 158 are set from the plane of blade 16 initially by adjustment of knobs 170 and 172. Clockwise rotation of knob 170 draws the adjustment arm 168 towards the knob 170 and thereby allows spring 164 to urge arm 156 inward toward the plane of the saw blade 16 to narrow the selected dimension. Counterclockwise rotation, on the other hand, urges the adjustment arm 168 and sensor 166 toward the target 165 and causes sensing arm 156 to move outward from the plane of the blade 16 to widen the reference dimension. Knob 172 acts upon arm 156 in the same manner for dimensioning the front side of the tooth. The initial selected settings correspond to the desired dimensions for the sawtooth 17 and are transmitted to the programmable controller 46, which recognizes the settings as such because of the retracted position of the plate 152.

The plate 152 is fed along the track 148 by a support bracket 174 affixed to the top rear portion of plate 152. As best seen in FIG. 8, the support bracket curves downward to connect at its other end to a rod 176 actuable by a hydraulic cylinder 178. The cylinder, in turn, is attached by a cylinder clamp 180 to the rear arm 182 of the clamp 26. The plate 152 is sized so that the sensing arms 156 and 158 are extended across the length of the clamped tooth 17 from gullet to gullet. This extension and then retraction ensures that the widest dimensions of the tooth are encountered and deflect each arm accordingly for measurement. The deflection of each sensing arm 156 and 158 causes the target 165 and rear of arm 158 to move away from sensor 166. The gap that results is sensed electrically and the information transmitted to the controller 46, which latches on the maximum gap. The movement of plate 152 and attached arm 156 and 158 between the retracted position and extended position is sensed by limit switches (not shown) in communication with the programmable controller 46.

Operation

Figure 10:
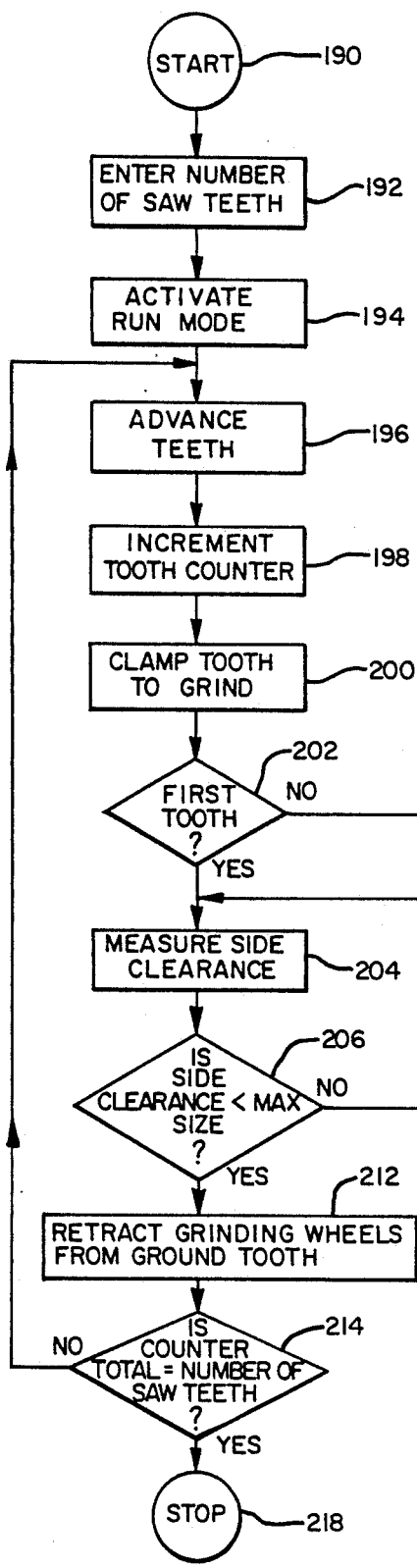
FIG. 10 is a flowchart illustrating the operation of the apparatus.
Figure 9:
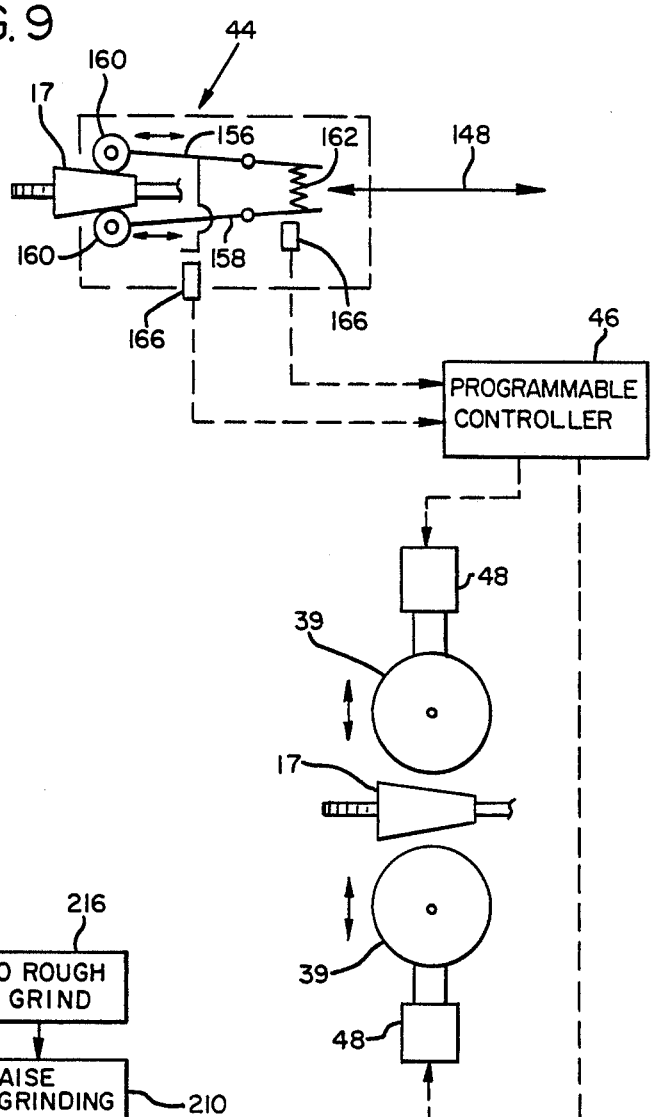
FIG. 9 is a schematic diagram of the apparatus.

FIG. 9 is a schematic diagram for illustrating the operation of the apparatus 11 as controlled by controller 46 in the flowchart of FIG. 10. The steps in FIG. 10 will be referred to by numerals in parentheses in the following description.

Initially, the apparatus is activated (190), and the number of saw teeth on the blade to be sharpened is input to the controller 46 (192). The desired reference dimension for each side of the teeth is selected and dialed into the probe 44, which transmits this information to the controller 46. The controller is then switched to its run mode (194). It responds by commanding the indexer 24 to advance a tooth to the grinding position (196), as indicated in FIG. 9. The controller 46 then increments an internal tooth counter (198) to keep track of the number of teeth ground. It then commands the clamp 26 to clamp the grinding tooth in the grinding position (200). With the tooth 17 clamped, the controller determines whether this tooth is the first tooth of the blade to be ground (202). This determination is made for setting the retraction required for rough grinds on subsequent teeth. Assuming this is the first tooth, the sensing arms 156 and 158 of the probe 44 are advanced across the sides of the tooth 17 to measure the deviation of the sides from the initial reference dimensions. This advancement causes the tooth to deflect each sensing arm from its initial setting, the amount of deflection indicating the dimension of the tooth. The sensors 166 sense the probe deflection by the proximity of the arms 156 and 158 and generate signals indicative of the measured dimensions. These measurement signals are then transmitted to the controller 46 for comparison against the reference dimensions. In the present embodiment, the measurement signals indicate whether the side clearance on each side of the tooth 17 is greater than ten thousandths, five thousandths, or one thousandths of an inch over the preselected reference dimension. The maximum values of the measurement signals are latched by the controller 46 as the sensing arms first advance over the teeth and then withdrawn. The controller 46 determines whether the side clearance on each side of the tooth is greater than the reference dimensions, maximum permitted (204, 206). If the clearance is greater than the maximum dimension, then the grinding wheels are moved in for performing fine grind on the tooth (208). The fine grind comprises moving the grinding wheels inward five thousandths of an inch if a measured dimension is more than five thousandths of an inch greater than the preselected reference dimension. If the measured dimension is between five thousandths and one thousandth of an inch over the preselected dimension, then the grinding wheels are moved inward at thousandth of an inch increments. After than movement inward and grinding, the wheels are raised (210) and another measurement is taken (204).

This cycle of measuring, comparing, and grinding continues until the side clearance is less than the maximum size (206). Each grinding wheel 39 is operated independently. Once its associated side of the tooth is ground within the preselected dimension, the grinding wheel is retracted until grinding of the other side is completed. At that point, both of the grinding wheels are retracted from the ground tooth a predetermined distance, such as twenty thousandths of an inch (212). The comparator then checks the counter total of the ground tooth against the number of saw teeth on the blade 16 (214). If not all teeth have yet been ground, the controller 46 commands the indexer 24 to advance the next tooth (196). The operation continues as before, except that on subsequent teeth a rough grind is performed before the probe 44 measures the side clearance of the tooth (216). In the rough grind, the retracted grinding heads are moved into grind nineteen thousandths of an inch and are then raised (210). From the previous retraction, the side clearances should then be within one thousandth of an inch of the preselected dimension. However, because of continual wear on the grinding wheels and the possibility of misaligned teeth, this is not always the case. The probe 44 then measures the side clearance (204), determines if it is less or greater than the maximum size (206), and performs a fine grind if necessary (208). This cycle continues as before until each side clearance is less than the maximum size defined by the preselected dimension.

The operation continues as illustrated until the number of teeth ground equals the number of sawtooth entered into the controller's memory. At this point, the controller ceases operation and ceases advancing successive saw teeth (218).

Having illustrated and described the principles of the invention in a preferred embodiment, it should be apparent to those skilled in the art that the invention can be modified in arrangement and detail without departing from such principles.

I claim all modifications coming within the spirit and scope of the following claims:

1. Apparatus for grinding the working portion of a tool to a preselected dimension comprising:
   securing means for positioning said working portion in a grinding position;
   grinding means for grinding said working portion, said grinding means being mounted for movement toward and away from said grinding position;
   measuring means for measuring a dimension of said working portion to be ground by said grinding means, said measuring means being mounted for movement toward and away from said grinding position;
   first feed means for feeding said grinding means toward and away from said grinding position;
   second feed means for feeding said measuring means toward and away from said grinding position; and
   control means operable to sequentially:
   (a) operate said first feed means to feed said grinding means into said grinding position to grind said working portion to a first dimension and then feed said grinding means away from said grinding position;
   (b) operate said second feed means to feed said measuring means into said grinding position to measure the first dimension of the working portion and then feed said measuring means away from said grinding position;
   (c) compare said first dimension to said preselected dimension; and
   (d) repeat functions (a), (b), and (c) in sequence to grind, measure and compare subsequent ground dimensions of said working portion until the ground dimension substantially equals the preselected dimension.

2. Apparatus according to claim 1 wherein said control means is a programmable control means including means for programming and storing said preselected dimension, comparator means for comparing said preselected dimension to the measured dimensions, and adjusting means for adjusting the feed of said first feed means to determine the grinding position of the grinding means in response to the comparing of the measured and preselected dimensions.

3. Apparatus according to claim 2 wherein said measuring means comprises sensing means for sensing the measured dimension, signal generating means for generating a measurement signal indicative of the measured dimension in response to sensings of said sensing means, and signal transmitting means for transmitting the measurement signal to said comparator means.

4. Apparatus according to claim 1 wherein said working portion comprises the cutting tip of a sawtooth portion of a saw blade;
   said grinding means includes a pair of opposed grinding elements positioned for grinding opposite sides of said cutting tip and mounted for adjustment toward and away from said opposite sides;
   said measuring means comprises a pair of sensing means operable to sense the deviation of a side of said cutting tip from a reference dimension;
   mounting means for mounting the saw blade to position successive saw teeth in said grinding position;
   indexing means for advancing saw teeth of said saw blade in succession into said grinding position;
   clamping means for clamping said saw teeth in the grinding position;
   said control means including means for releasing said clamping means and operating said indexing means to advance succeeding saw teeth into said grinding position after a preceding sawtooth has been ground to said preselected dimension.

5. Apparatus for grinding a saw blade to a preselected dimension, comprising:
   securing means for securing a portion of the saw blade in a grinding position;
   means for measuring a dimension of the saw blade portion;
   means for grinding the saw blade portion; and
   control means responsive to the measuring means for comparing the measured dimension against the preselected dimension and causing said grinding means to grind the saw blade portion and said measuring means to measure the saw blade portion alternately until the portion is ground within the preselected dimension.

6. The apparatus of claim 5 in which the saw blade includes a plurality of saw teeth and the saw blade portion comprises a sawtooth.

7. The apparatus of claim 5 in which the securing means comprises:
   indexing means for engaging the saw blade to advance a portion to the grinding position; and
   clamping means for clamping the advanced portion in the grinding position.

8. The apparatus of claim 5 in which the measuring means comprises:
   a probe;
   means for adjusting the probe to an initial setting corresponding to the preselected dimension;
   means for advancing the probe across the saw blade portion to measure the dimension; and
   sensing means for transmitting the preselected dimension and measured dimension to the control means.

9. The apparatus of claim 8 in which the sensing means comprises an electrical sensor adapted to sense deflection of the probe deflection by the saw blade portion and indicate therefrom to the control means the portion of the saw blade to be ground away.

10. The apparatus of claim 5 in which the measuring means comprises:
    a pair of opposed sensing arms each having a measuring wheel at one end, the arms defining a plane therebetween aligned with the plane of the saw blade;
    means for pivoting each arm for deflection;

means for adjusting the sensing arms to initial settings corresponding to the preselected dimension for each side of the saw blade portion;

means for advancing the sensing arms across the saw blade portion for measuring the dimension of each side of the portion by the deflection of the arms saw blade portion from their initial settings; and an electrical sensor for each arm adapted to sense the extent of arm deflection and indicate therefrom the portion of the saw blade to be ground away.

11. The apparatus of claim 10 in which the grinding means comprises:

a grinding wheel; and positioning means operable to adjust the grinding wheel position relative to the saw blade portion to grind the portion to the preselected dimension in response to comparisons of the measured and preselected dimensions by the control means.

12. The apparatus of claim 11 including means for moving the grinding wheel along its rotational axis while grinding the saw blade portion.

13. The apparatus of claim 11 including means for adjusting the plane of the grinding wheel relative to the saw blade portion to grind the tooth to a desired clearance angle.

14. The apparatus of claim 10 in which the control means comprises a programmable controller in communication with the positioning means, measuring means, and grinding means.

15. An apparatus for grinding the opposite sides of saw teeth of a saw blade to reference dimensions, comprising:

means for supporting a saw blade for advancement;

indexing means for advancing the saw blade tooth by tooth to a grinding position;

means for clamping a sawtooth in the a grinding position;

measuring means for measuring a dimension of each of said opposite sides of a sawtooth in the grinding position;

grinding means movable toward and away from the opposite sides of a sawtooth in the grinding position; and controller means responsive to measurements of the measuring means for comparing the measured dimensions with the reference dimensions, adjusting the positions of the grinding means in response to comparisons of the measured and reference dimensions, and alternately causing said grinding means to grind the sides of the sawtooth and said measuring means to measure the dimensions at opposite sides of the tooth until the sides are ground to substantially the reference dimensions.

16. The apparatus of claim 15 including means for releasing said clamping means and operating said indexing means when a given tooth has been ground to the reference dimensions, to advance a succeeding tooth to the grinding position.

17. A method of grinding multiple teeth of a saw blade to a preselected dimension, comprising the following sequence of steps:

(a) measuring a dimension of a sawtooth in a grinding position;

(b) comparing the measured dimension to the preselected dimension;

(c) grinding the tooth if the measured dimension exceeds the preselected dimension;

(d) repeating the previous steps (a)-(c) in sequence until the sawtooth is ground to substantially the preselected dimension;

(e) then proceeding to successive teeth of the saw blade and repeating steps (a)-(d) until all teeth of the saw blade have been ground to substantially the preselected dimension.

18. The method of claim 17 including first grinding a tooth to a dimension proximate the preselected dimension before measuring the tooth dimension.

19. The method of claim 17 including:

counting each sawtooth advanced to the grinding position;

comparing the total count against the number of teeth on the saw blade; and stopping the grinding once the total count equals the number of saw teeth on the saw blade.

20. The apparatus of claim 15 wherein said indexing means includes a feed finger engageable with each tooth to advance the tooth to the grinding position, said feed finger including a notch engageable with the tip of the tooth.

* * * * *